United States Patent [19]
Nishida

[11] Patent Number: 5,440,688
[45] Date of Patent: Aug. 8, 1995

[54] NETWORK MANAGEMENT SYSTEM EMPLOYING A MAIN PROCESSOR AND AN AUXILIARY PROCESSOR TO RECEIVE ALARM MESSAGES AND TRANSMIT RECOVERY COMMANDS

[75] Inventor: Tetsurou Nishida, Tokyo, Japan

[73] Assignee: NEC Corporation, Tokyo, Japan

[21] Appl. No.: 93,329

[22] Filed: Jul. 2, 1993

Related U.S. Application Data

[63] Continuation of Ser. No. 828,454, Jan. 31, 1992, abandoned.

[30] Foreign Application Priority Data

Jan. 31, 1991 [JP] Japan .................................. 3-010511

[51] Int. Cl.⁶ ..................... G06F 11/30; G06F 11/34
[52] U.S. Cl. ..................... 395/182.02; 364/DIG. 1; 364/228.4; 364/242.94; 364/264.4; 364/264.5; 371/8.2; 395/183.06; 395/183.15
[58] Field of Search .................... 364/550, 551.01, 554; 370/13, 16; 371/7, 11.2, 20.1; 379/1-2, 9-10, 14; 395/200, 325, 575, 800, 700

[56] References Cited

U.S. PATENT DOCUMENTS

| | | | |
|---|---|---|---|
| 3,587,058 | 6/1971 | Butler et al. | 395/325 |
| 3,778,767 | 12/1973 | Carlyle et al. | 371/20.1 |
| 3,920,975 | 11/1975 | Bass | 235/153 AK |
| 3,980,839 | 9/1976 | Hutcheson | 379/15 |
| 4,177,514 | 12/1979 | Rupp | 395/800 |
| 4,197,427 | 4/1980 | Hutcheson et al. | 379/133 |
| 4,841,437 | 6/1989 | Lubarski et al. | 395/575 |
| 4,912,711 | 3/1990 | Shiramizu | 371/16.1 |
| 4,922,491 | 5/1990 | Coale | 371/16.1 |
| 4,937,825 | 6/1990 | Ballard et al. | 371/20.1 |
| 4,956,835 | 9/1990 | Grover | 370/16 |
| 5,018,097 | 5/1991 | Kuhlmann et al. | 395/700 |
| 5,036,514 | 7/1991 | Downes et al. | 371/51 |
| 5,090,014 | 2/1992 | Polich et al. | 371/15.1 |
| 5,111,384 | 5/1992 | Aslanian et al. | 395/575 |
| 5,111,460 | 5/1992 | Botzenhardt et al. | 371/29.1 |
| 5,119,019 | 6/1992 | Tonomura et al. | 395/800 |
| 5,127,005 | 6/1992 | Oda et al. | 371/15.1 |
| 5,127,041 | 6/1992 | O'Sullivan | 379/59 |
| 5,166,674 | 11/1992 | Baum et al. | 340/825.07 |
| 5,285,494 | 2/1994 | Sprecher et al. | 375/59 |

*Primary Examiner*—Thomas C. Lee
*Assistant Examiner*—Lance Leonard Barry
*Attorney, Agent, or Firm*—Foley & Lardner

[57] ABSTRACT

In a network management system, a main processor is connected to nodes of a network to receive alarm messages therefrom and to transmit command messages thereto. Unique relationships between alarm messages and network events are defined in a map. Received messages are sorted according to the map, so that those of the messages defined in the map are detected and supplied to an auxiliary processor. The auxiliary processor has a procedure registration table for storing procedures addressable with an event identifier supplied from the map. Each procedure specifies recovery actions to be taken by the network and a count threshold value. A manual event entry means is provided for defining the map and entering procedures into the procedure registration table. A message counter is responsive to a procedure supplied from the procedure registration table for counting the alarm messages supplied from the main processor for producing an output when the count threshold specified by the procedure is reached. An analyzer, receives the alarm messages from the main processor and is responsive to the output of the message counter for analyzing the alarm messages which have been received during the count period. From the output of the analyzer command messages are generated and transmitted to the network.

8 Claims, 2 Drawing Sheets

NETWORK MANAGEMENT SYSTEM EMPLOYING A MAIN PROCESSOR AND AN AUXILIARY PROCESSOR TO RECEIVE ALARM MESSAGES AND TRANSMIT RECOVERY COMMANDS

This application is a continuation of application Ser. No. 07/828,454, filed Jan. 31, 1992, now abandoned.

BACKGROUND OF THE INVENTION

1. Field of Invention

The present invention relates to a network management system for providing management and maintenance of a switched network of electronic switching systems.

2. Description of Related Art

In a conventional network management system, a main frame computer is designed to handle all incoming alarm messages from the network under any circumstances. However, with additions of new network management features and services which require time-consuming processing, the main frame computer will be overburdened if a vast amount of alarm messages are generated from the network in a short period of time.

SUMMARY OF THE INVENTION

It is therefore an object of the present invention to provide a network management system in which the burden of the management processor is relieved by segregating time-consuming tasks from the main processor to one or more auxiliary processors.

Since additions of hardware to or expansion of the main frame computer is not an easy task, and since workstations and personal computers have been drastically improved in comparison with main frame computers, the present invention takes advantage of such small computers for shifting time-consuming network management tasks from the main processor to an auxiliary processor.

According to the present invention, there is provided a network management system which includes a main processor connected to a communications network having a plurality of nodes interconnected by transmission lines. The main processor monitors the network nodes by receiving alarm messages therefrom and transmitting command messages to the network, and provides overall system control such as network supervising, testing and observation reporting, as well as those tasks which must be processed on a real-time basis. The main processor includes an event registration table and a message detector for receiving alarm messages from the network. The event registration table has a map in which unique relationships between alarm messages and network events are defined. The event registration table produces an event identifier in response to an alarm message received from the network. The message detector detects those of the received alarm messages which are defined in the event registration table. In order to reduce the burden of the main processor, an auxiliary processor is provided. The auxiliary processor has a procedure registration table for storing procedures addressable with the event identifier supplied from the event registration table. Each of the stored procedures specifies one or more recovery actions to be taken by the network and a count threshold for counting messages. A manual event entry means is provided for entering a map into the event registration table of the main processor and procedures into the procedure registration table. A message counter is responsive to a procedure supplied from the procedure registration table for counting alarm messages detected by the message detector for producing an output when a count threshold specified by the supplied procedure is reached. An analyzer is provided in the auxiliary processor for receiving the alarm messages from the main processor and responsive to the output of the message counter for analyzing the alarm messages received during the period of the count to produce result data. From the result data, command messages are generated and transmitted to the network.

BRIEF DESCRIPTION OF THE DRAWINGS

The present invention will be described in further detail with reference to the accompanying drawings, in which.

DETAILED DESCRIPTION

Figure 1:
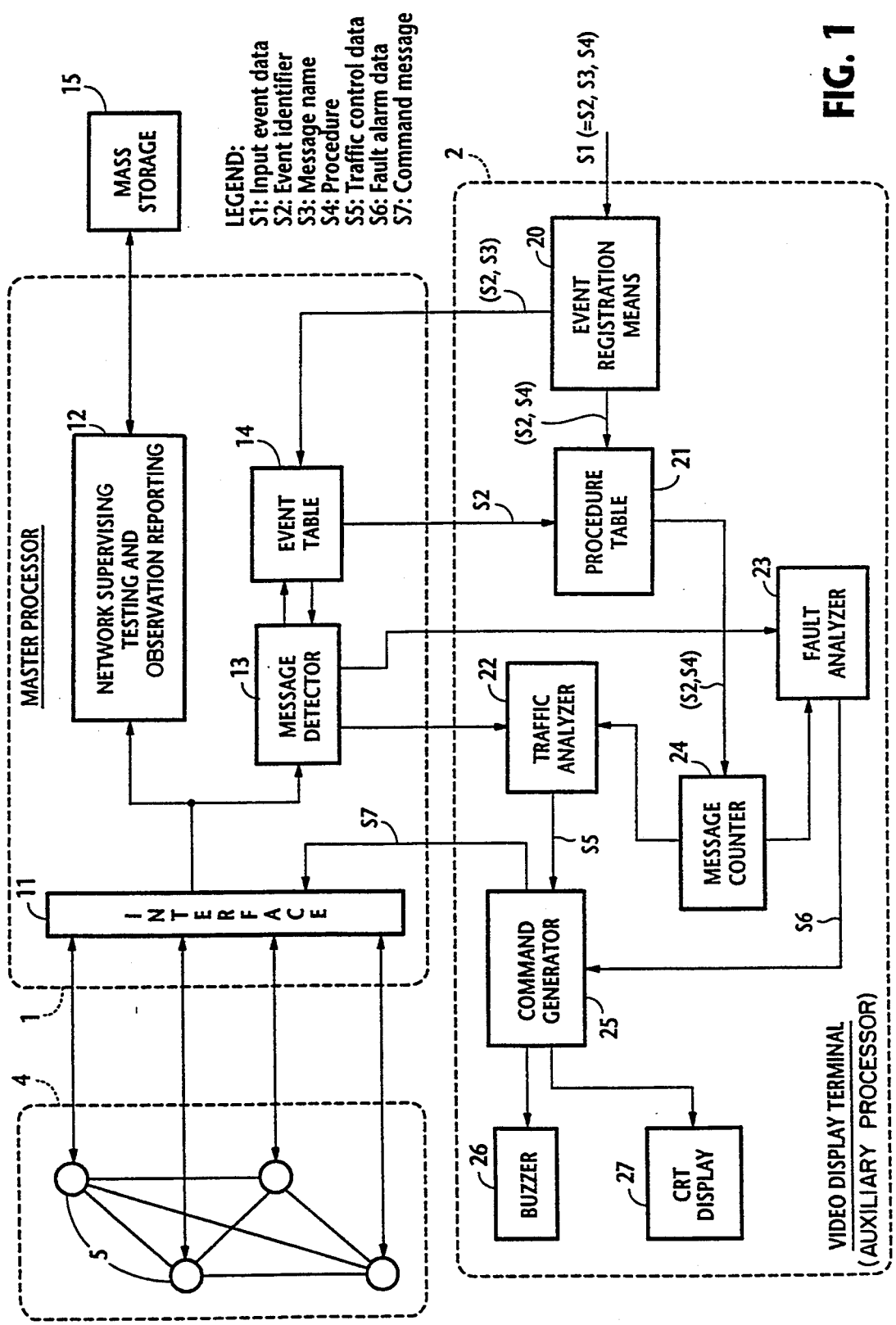
FIG. 1 is a block diagram of a network management system of the present invention in which a single video display terminal is provided.

In FIG. 1, the network management system of this invention includes a master processor 1 which receives various alarm messages from nodes 5 of a telecommunications network 4 and, in response, sends command messages received from an auxiliary processor, or video display terminal 2, to the network nodes 5. Each node of the network is an analog or digital electronic switching system. Master processor 1 includes an interface 11 through which the network alarm messages are sequentially received and command messages from the network management system are sent to appropriate network nodes 5. Master processor 1 has a main unit 12 which provides overall system control such as network supervising, testing and observation reporting using a mass storage 15, and processes a vast amount of network data on a real-time basis.

In the master processor, a message detector 13 is included to examine received alarm messages and to supply message names to an event table 14, and to supply the contents of the messages to video display terminal 2 if these messages are registered in the event table 14 as a network event.

Video display terminal 2 is a workstation or a personal computer, and includes an event registration means 20 into which network events to be registered are entered by network management personnel. Event data S1 includes an event identifier S2, a list of alarm message names S3, and a procedure S4 which specifies actions to be taken by terminal 2. The entered event identifier S2 and alarm message names S3 are supplied to master processor 1 and stored in event table 14 to define therein a map for establishing relationships between events and corresponding alarm messages. Procedure data including event identifier S2 and procedure S4 are stored in a procedure table 21 to define a map that establishes relationships between events and corresponding procedures. In response to an alarm message name S3 from message detector 13, event table 14 generates a corresponding event identifier S2, identifying a unique relationship between an alarm message and a network event. The identifier S2 is supplied to procedure table 21 to read out a corresponding procedure S4.

A traffic analyzer 22 and a fault analyzer 23 are provided. Traffic analyzer 22 receives traffic-related alarm messages from message detector 13, while fault analyzer 23 receives fault-related alarm messages. A message counter 24 is connected to the output of procedure table 21 to count those alarm messages which are specified by the event identifier S2 and to generate an output when the count reaches a threshold specified by the procedure S4. The output of message counter 24 is supplied to the traffic analyzer 22 or fault analyzer 23 as an enable signal.

As will be described, each of the traffic analyzer 22 and fault analyzer 23 includes a memory for storing traffic-related or fault-related alarm messages. When enabled by the counter 24, each analyzer examines the contents of alarm messages which have been received until a specified threshold of the counter 24 is reached, and identifies one or more network nodes from which the messages have issued. Traffic analyzer 22 produces traffic control data S5 indicating network nodes and traffic control actions to be taken by such nodes. Fault analyzer 23 produces fault-related signals S6 indicating network nodes and fault recovery actions to be taken by such nodes. The outputs of both analyzers 22 and 23 are supplied to a command generator 25 which, in response, supplies command messages S7 to interface 11 for transmission to network nodes specified by the messages S7. If an event of critical level is detected, command generator 25 activates a buzzer 26 to alert the network management personnel. A CRT display unit 27 is connected to command generator 25 to provide an image display of the network nodes affected by a network event.

The network management system defines five levels of emergency; "critical", "major", "minor", "notice" and "information" with the critical level being at the highest in the range of emergencies demanding immediate attention by the network management personnel, and the information level being at the lowest simply indicating the occurrence of an event.

Details of the operation of the network management system will be described below using example cases.

EXAMPLE 1

A hard-to-reach message is one example of an event. This message will be received from a network node if calls directed from that node to a particular destination node have a low rate of completion. The hard-to-reach (HTR) message is registered as an event of "notice level" in the event table 14 and a corresponding S4 procedure is read out of procedure table 21. The procedure S4 specifies actions to be taken by terminal 2. These actions include: (1) to increment a count for the destination node by one in response to each HTR message from a different network node, and (2) if the count value exceeds a prescribed high threshold value, transmit call-restriction command messages to network nodes from which the HTR messages have been received.

Thus, message counter 24 increments by one the message count value of a node indicated by a received HTR message and enables the traffic analyzer 22 when the prescribed count is reached. Traffic analyzer 22 proceeds to analyze HTR messages received from nodes surrounding the destination node, determines that call restriction is to be effected, and directs the command generator 25 to transmit call-restriction messages to the surrounding nodes.

Another example of a network event is a clear-HTR message which invokes a procedure which includes actions for decrementing the HTR count value of the destination node by one and transmitting clear call-restriction messages to the surrounding nodes when the count becomes lower than a prescribed lower threshold value. In this instance, message counter 24 decrements the message count value of the destination node indicated by the received clear HTR message and enables the traffic analyzer 22 when the prescribed lower threshold value is reached. Traffic analyzer 22 proceeds to analyze HTR messages received from the nodes surrounding the destination node, determines that call restriction is to be cleared, and directs the command generator 25 to transmit clear call-restriction messages to the surrounding nodes.

EXAMPLE 2

A line error message is registered as an event. In response to this message, procedure table 21 supplies the message counter 24 with an event identifier S2, as well as a procedure S4 corresponding to that message. In this case, the procedure specifies that a count threshold be set in the counter 24 so that, when a prescribed number of such error messages is received within the period of 24 hours, such messages are treated as an event. When this occurs, message counter 24 enables a fault analyzer 23 which proceeds to analyze error messages that have been received within the specified period. Fault analyzer 23 produces an alarm signal S6 indicating that the rate of error-message occurrences has exceeded an alarm limit. Command generator 25 translates the alarm signal S6 into appropriate command signals for coupling to interface 11.

By segregating time-consuming tasks from the main processor 1, the latter is able to concentrate on those tasks which require high speed processing.

Figure 2:
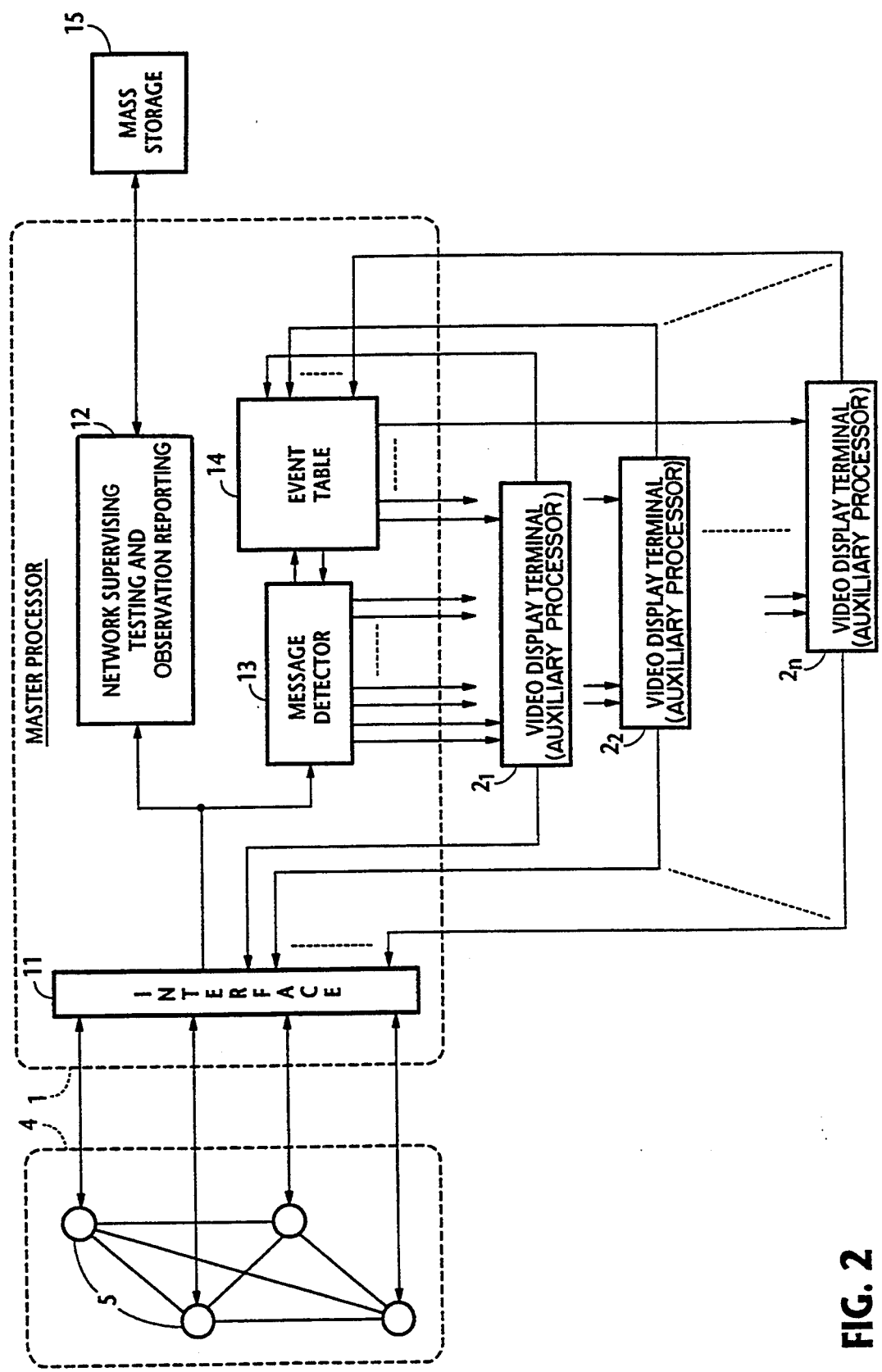
FIG. 2 is a block diagram of the network management system of this invention using a plurality of distributed video display terminals.

The burden of the main processor 1 can be further relieved by the provision of a plurality of distributed video display terminals $2_1$, $2_2$ through $2_n$ as shown in FIG. 2. In this distributed terminal configuration, each video display terminal has a unique set of network events, and the message detector 13 and event table 14 of the main processor are shared in common by all video display terminals 2. Different categories of traffic and fault-related events can be assigned to respective video display terminals to reduce the burden of each terminal 2 as well as the burden of the main processor 1.

What is claimed is:

1. A network management system for a communications network of a plurality of electronic switching systems, said network management system comprising:
a main processor comprising:
   interface means for receiving alarm messages from said communications network and transmitting recovery command messages thereto for recovering said switching systems from abnormal conditions;
   main analyzer means, connected to said interface means, for analyzing the received alarm messages and producing observation reports;
   message detector means, connected to said interface means, for determining to which alarm message defined in a list of alarm messages said received messages correspond; and
   an event table, connected to said message detector means, in which unique relationships between said alarm messages in said list and network events are stored, for producing an event identifier when a corresponding alarm message determined by said message detector means is a network event; and an auxiliary processor connected to said main processor, said auxiliary processor comprising:
   a procedure table, connected to said event table, in which said event identifier and corresponding procedures are stored, for selecting a stored procedure in response to said event identifier from said event table, and producing an output containing said event identifier and the selected procedure;
   message counter means, receiving said output from said procedure table, for counting said event identifier contained therein and producing an output when the counted event identifiers exceed a threshold value specified by said selected procedure contained in said output of said procedure table, said output of said message counter means containing said selected procedure;
   auxiliary analyzer means, connected to said message detector means and said message counter means, responsive to said output of said message counter means, for receiving alarm messages from said message detector means which are identified by the said counted event identifiers, analyzing said received alarm messages in accordance with said selected procedure contained in said output of said message counter means, and producing an analysis result; and
   means, responsive to said analysis result, for generating one of said recovery command messages and transmitting said one recovery command message to said interface means of said main processor.

2. A network management system as claimed in claim 1, wherein said auxiliary processor further comprises an event registration means, connected to said event table of said main processor and said procedure table of said auxiliary processor, for entering said event identifier and names of alarm messages defined in said list into said event table and entering said event identifier and said procedure into said procedure table.

3. A network management system for a communications network of a plurality of electronic switching systems, said network management system comprising:
   a main processor comprising:
      interface means for receiving alarm messages from said communications network and transmitting one of a traffic recovery command message and a fault recovery command message thereto for recovering said switching systems from abnormal conditions;
      main analyzer means, connected to said interface means, for analyzing the received alarm messages and producing observation reports;
      message detector means, connected to said interface means, for determining to which alarm message defined in a list of alarm messages said received messages correspond; and
      an event table, connected to said message detector means, in which unique relationships between said alarm messages defined in said list and network events are stored, for producing an event identifier when a corresponding alarm message determined by the message detector means is a network event; and an auxiliary processor connected to said main processor, said auxiliary processor comprising:
      a procedure table, connected to said event table, in which said event identifier and corresponding procedures are stored, for selecting a stored procedure in response to said event identifier from said event table, and producing an output containing said event identifier and the selected procedure;
      a message counter, connected to said procedure table, and responsive to said output of said procedure table, counting said event identifier contained therein and which identifies a traffic-related alarm message relating to traffic conditions of said network determined by said message detector means, and producing a first output when said counted event identifiers exceed a first threshold value specified by said selected procedure; and counting said event identifier contained in said output of said procedure table and which identifies a fault-related alarm message relating to fault conditions of said network determined by said message detector means, and producing a second output when said counted event identifiers exceed a second threshold value specified by said selected procedure, each of said first and second outputs of said message counter means containing said selected procedure;
      traffic analyzer means, connected to said message detector means and said message counter, and responsive to said first output of said message counter, for analyzing traffic-related alarm messages from said message detector means in accordance with said selected procedure contained in said first output, and producing traffic control data;
      fault analyzer means connected to said message detector means and said message counter, and responsive to said second output of the message counter for analyzing said alarm messages in accordance with said selected procedure contained in said second output, and producing fault alarm data; and
      a command generator, connected to said traffic analyzer means and said fault analyzer means, generating and transmitting said traffic recovery command message to said interface means in response to said traffic control data, and generating and transmitting said fault recovery command message to said interface means in response to said fault alarm data.

4. A network management system for a communications network of a plurality of electronic switching systems, said network management system comprising:
   a main processor comprising:
      interface means for receiving alarm messages from said communications network and transmitting recovery command messages thereto for recovering said switching systems from abnormal conditions;
      main analyzer means, connected to said interface means, for analyzing the received alarm messages and producing observation reports;
      message detector means, connected to said interface means, for determining to which alarm message defined in a list of alarm messages said received messages correspond; and an event table, connected to said message detector means, in which unique relationships between the alarm messages defined in said list and network events are stored, for producing an event identifier when a corresponding alarm message determined by said message detector means is a network event; and a plurality of auxiliary processors connected to said main processor, each of said auxiliary processors comprising:

a procedure table, connected to said event table, in which said event identifier and corresponding procedures are stored, for selecting a stored procedure in response to said event identifier from the said event table, and producing an output containing said event identifier and said selected procedure;

message counter means, responsive to said output of said procedure table, for counting said event identifier contained therein and producing an output when said counted event identifiers exceed a threshold value specified by said selected procedure contained in said output of said procedure table, said output of said message counter means containing said selected procedure;

auxiliary analyzer means, connected to said message detector means and said message counter means, responsive to said output of said message counter means, for receiving alarm messages from said message detector means which are identified by the counted event identifiers, analyzing the received alarm messages in accordance with the said selected procedure contained in said output of said message counter means, and producing therefrom an analysis result; and means, responsive to said analysis result, for generating one of said recovery command messages and transmitting said one recovery command message to said interface means of said main processor.

5. A network management system for a communications network of a plurality of electronic switching systems, said network management system comprising:

a main processor comprising:

interface means for receiving alarm messages from said communications network and transmitting one of a traffic recovery command message and a fault recovery command message thereto for recovering said switching systems from abnormal conditions;

main analyzer means, connected to said interface means, for analyzing the received alarm messages and producing observation reports;

message detector means, connected to said interface means, for determining to which alarm message defined in a list of alarm messages said received messages correspond; and an event table, connected to said message detector means, in which unique relationships between the alarm messages defined in said list and network events are stored, for producing an event identifier when a corresponding alarm message detected by said message detector means is a network event; and a plurality of distributed auxiliary processors connected to said main processor, each of the auxiliary processors comprising:

a procedure table, connected to said event table, in which said event identifier and corresponding procedures are stored, for selecting a stored procedure in response to said event identifier from said event table, and producing an output containing said event identifier and said selected procedure;

message counter, connected to said procedure table, and responsive to said output of the procedure table, counting the event identifier contained therein and which identifies a traffic-related alarm message relating to traffic conditions of said network determined by said message detector means, and producing a first output when the counted event identifiers exceed a first threshold value specified by said selected procedure; and counting the event identifier contained in said output of said procedure table and which identifies a fault-related alarm message relating to fault conditions of said network determined by said message detector means, and producing a second output when the counted event identifiers exceed a second threshold value specified by said selected procedure, each of said first and second outputs of said message counter means containing said selected procedure;

traffic analyzer means, connected to said message detector means and said message counter, and responsive to said first output of said message counter, for analyzing traffic-related alarm messages from said message detector means in accordance with said selected procedure contained in said first output, and producing traffic control data;

fault analyzer means, connected to said message detector means and said message counter, and responsive to said second output of said message counter, for analyzing the alarm messages in accordance with said selected procedure contained in said second output, and producing fault alarm data; and a command generator, connected to said traffic analyzer means and said fault analyzer means, generating and transmitting said traffic recovery command message to said interface means in response to said traffic control data, and generating and transmitting said fault recovery command message to said interface means in response to said fault alarm data.

6. A network management system as claimed in claim 6 or 5, wherein each of said auxiliary processor further comprises an event registration means, connected to said event table of said main processor and said procedure table of said auxiliary processors, for entering said event identifier and names of alarm messages defined in said list into said event table and entering said event identifier and said procedure into said procedure table.

7. A network management system as claimed in claim 1, 3, 4 or 5, wherein said auxiliary processor is a workstation.

8. A network management system as claimed in claim 1, 3, 4 or 5, wherein said auxiliary processor is a personal computer.

* * * * *